US008412777B2

(12) United States Patent
Laux et al.

(10) Patent No.: US 8,412,777 B2
(45) Date of Patent: Apr. 2, 2013

(54) METHODS AND SYSTEMS FOR UNIFYING DATA PARAMETER PASSING IN A DATA PROCESSING SYSTEM

(75) Inventors: Thorsten O. Laux, Mountain View, CA (US); Klaus Ruehl, Hamburg (DE); Lars Oppermann, Hamburg (DE)

(73) Assignee: Oracle America, Inc., Redwood City, CA (US)

( * ) Notice: Subject to any disclaimer, the term of this patent is extended or adjusted under 35 U.S.C. 154(b) by 2644 days.

(21) Appl. No.: 10/301,314

(22) Filed: Nov. 21, 2002

(65) Prior Publication Data

US 2003/0097415 A1      May 22, 2003

(30) Foreign Application Priority Data

Nov. 21, 2001    (EP) ..................................... 01127749

(51) Int. Cl.
*G06F 15/16*      (2006.01)
(52) U.S. Cl. ........ 709/206; 709/203; 709/217; 709/219; 709/238
(58) Field of Classification Search .................. 709/206, 709/231, 238, 203, 217, 219
See application file for complete search history.

(56) References Cited

U.S. PATENT DOCUMENTS

| 6,707,580 | B1 * | 3/2004 | Bloomfield | 358/402 |
| 2002/0194366 | A1 * | 12/2002 | Bodin et al. | 709/238 |
| 2003/0084106 | A1 * | 5/2003 | Erev et al. | 709/206 |

OTHER PUBLICATIONS

W3C: "SOAP Version 1.2 Part 1: Messaging Framework" W3C Working Draft, 'Online!, Oct. 2, 2001, XP002198054, retrived from the Internet: <URL:http://www.w3.org/TR/2001/WD-soap12-part1-20011002/> 'retrieved on May 3, 2002!
W3C: "SOAP Version 1.2 Part 2: Adjuncts" W3C Working Draft, 'Online!, Oct. 2, 2001, XP002198055, Retrieved from the Internet: <URL:http://www.w3.org/TR/2001/WD-soap12-part2-20011002/> 'retrieved on May 3, 2002!
W3C: "SOAP Messages with Attachments" W3C Note, 'Online! XP002198056, retrieved from the Internet: <URL:http://www.w3.org/TR/2000/NOTE-SOAP-attachments-20001211> 'retrieved on May 3, 2002.
Enrik Frystyk Nielsen, Henry Sanders, Erik Christensen: "Direct Internet Message Encapsulation", Microsoft, 'Online!, May 23, 2001, XP002198057, Retrieved from the Internet: <URL:http://222.gotdotnet.com/team/xml_wsspecs/dime/dime.htm>, 'retrieve on May 3, 2002!
Aleksander Slominski, Madhusudhan Govindaraju, Dennis Gannon and Randall Bramley: TR548: SoapRMI C++/Java 1.1: Design and Implementation, Technical Report, Department of Computer Science, Indiana University, 'Online!, May 2001, XP002198058, Retrieved from the Internet: <URL:http://www.cs.indiana.edu/ftp/teachreports/TR548.html> 'retrieved on May 3, 2002!

* cited by examiner

*Primary Examiner* — Phuoc Nguyen
(74) *Attorney, Agent, or Firm* — Marsh Fischmann & Breyfogle, LLP; Jonathon A. Szumny (57) ABSTRACT

Methods, systems, and articles of manufacture consistent with the present invention provide for servers processing input data regardless of whether the input data is located in an attachment to a message from a client. The server receives a message from the client instructing the server to process data. Then, the server determines whether the data is located in an attachment to the message, and if the data is located in the attachment, moves the data to another location other than in the attachment.

18 Claims, 9 Drawing Sheets

DATA IN LOCATION = DATA FILE AT SERVER
DATA OUT LOCATION = DATA FILE OR ATTACHMENT

Fig. 4B (RELATED ART) PROBLEM OF THE RELATED ART

DATA IN LOCATION = ATTACHMENT TO MESSAGE
DATA OUT LOCATION = DATA FILE OR ATTACHMENT

FIG. 9
SERVER

METHODS AND SYSTEMS FOR UNIFYING DATA PARAMETER PASSING IN A DATA PROCESSING SYSTEM

CROSS-REFERENCE TO RELATED APPLICATIONS

This Application claims the benefit of the filing date and priority to the following foreign patent application, which is incorporated herein by reference:

European Patent Application serial number 01127749.8, entitled "A METHOD FOR UNIFYING A STREAM AND URL PARAMETER PASSING IN A DATA PROCESSING SYSTEM", filed Nov. 21, 2001.

FIELD OF THE INVENTION

The present invention relates to client and server communication, and in particular, relates to addressing data submitted in a message from a client to a server.

BACKGROUND OF THE INVENTION

Figure 1:
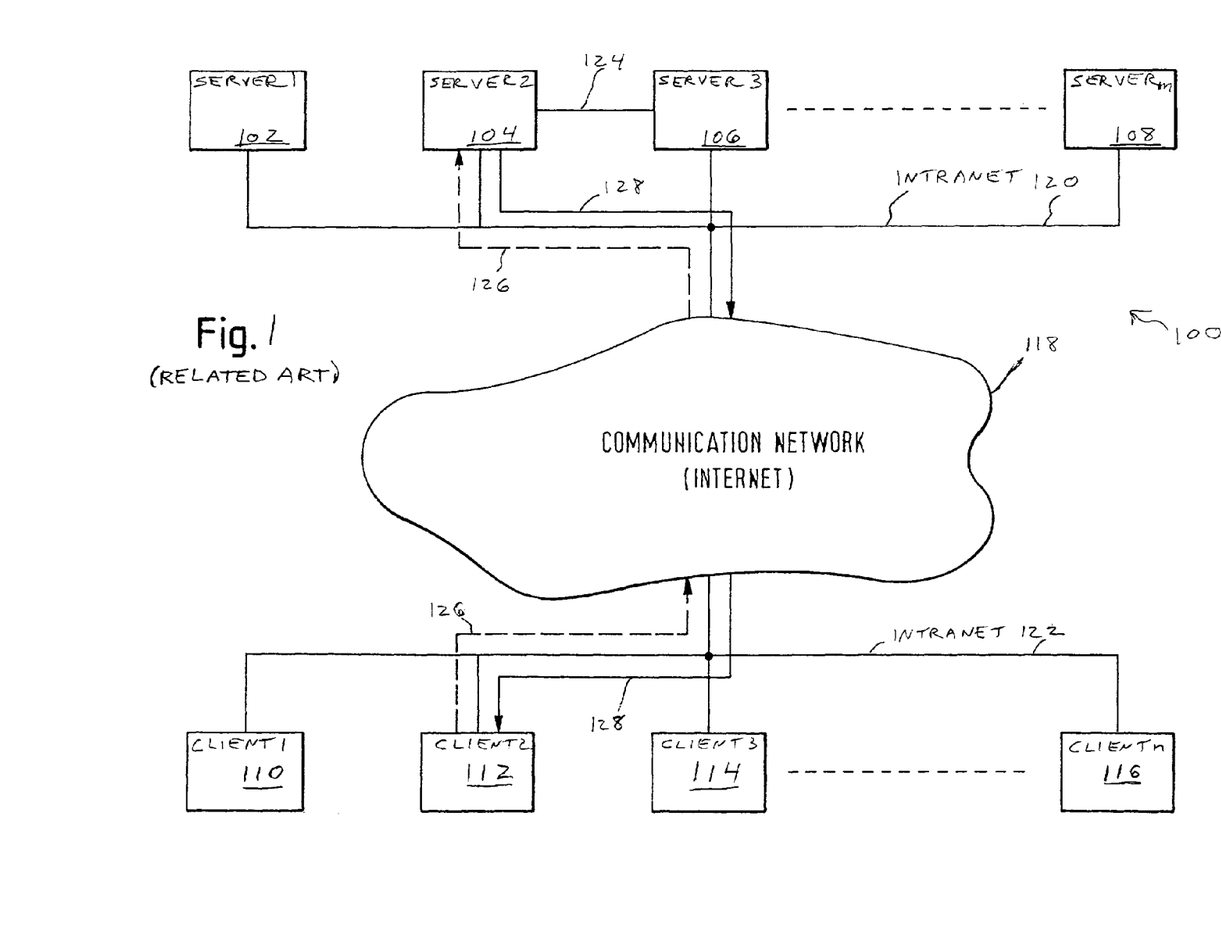
FIG. 1 depicts a block diagram of a conventional data processing system.

FIG. 1 shows a typical data processing system 100 for processing data. Data processing system 100 includes one or more servers 102, 104, 106, and 108 and one or more clients 110, 112, 114, and 116, which communicate through a communication network 118, such as the Internet. The servers are connected to each other and to communication network 118 via a server intranet 120. And the clients are connected to each other and to communication network 118 via a client intranet 122. The servers can also be connected to each other via a backend tunnel 124.

Data processing system 100 performs communications in communication network 118 through packet switching, line switching, or another communication technology. In the data processing system, clients, such as client 112, issue data processing request messages 126 through communication network 118 to one of the servers, while one or more of the servers, such as server 104, process data or retrieve data responsive to the data processing request messages 126 and return response messages 128 through communication network 118 to the requesting clients.

Although not shown in FIG. 1, a load balancer is typically used to distribute the data processing request messages 126 from the clients to the respective servers depending on the processing loads of the servers, such that an even distribution of request messages among the servers is achieved. That is, the request messages normally identify the desired type of processing and the location of the data sets to be processed, however, the messages do not normally specify a particular server for carrying out the processing. In fact, it is conventionally irrelevant to the client which server carries out the data set processing, as long as, the correct type of answer or response is returned from the server and the correct type of data processing is carried out on the server side of the communication network.

Figure 2:
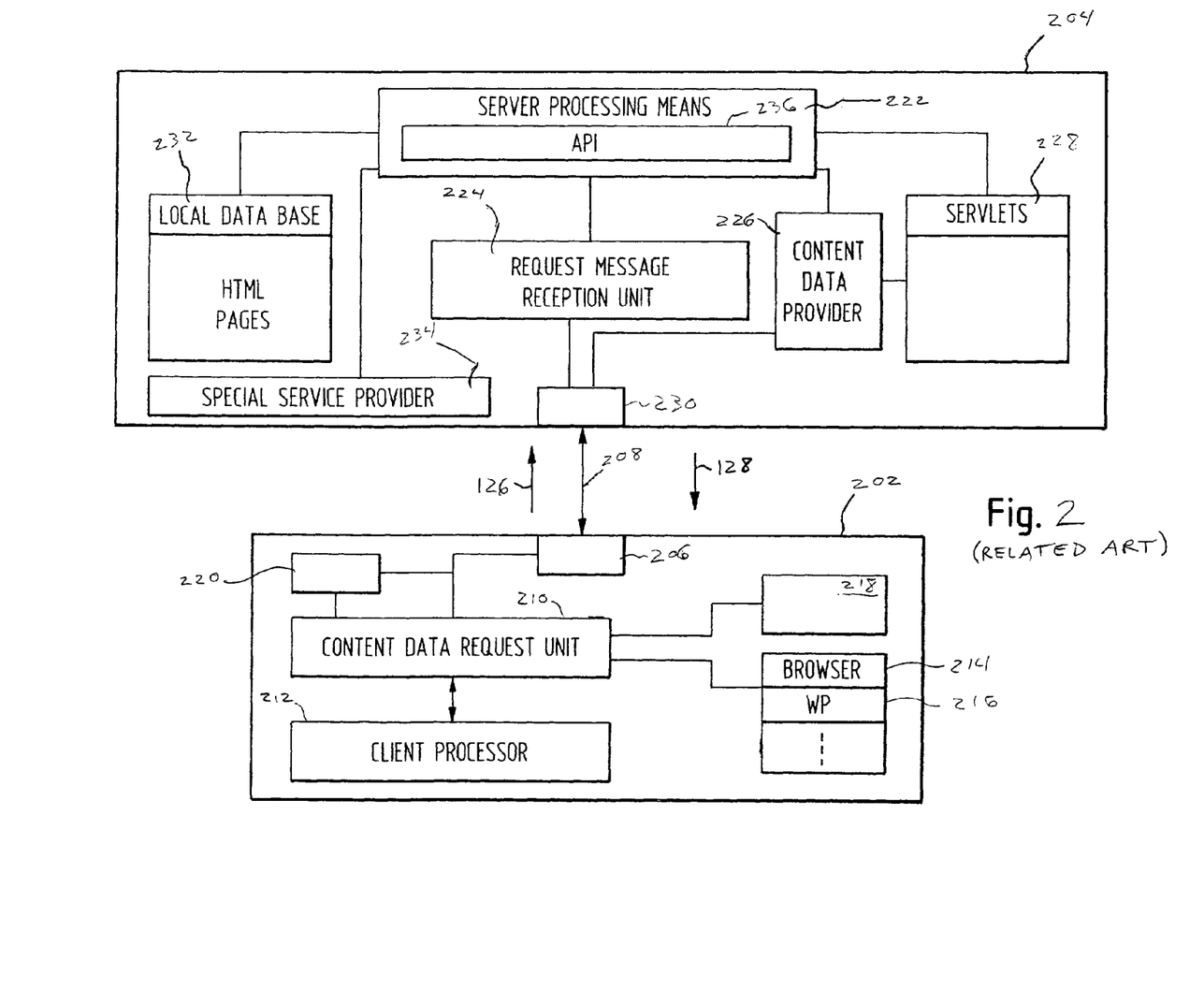
FIG. 2 depicts a more detailed block diagram of the client and server of FIG. 1.

For carrying out their respective functions, the clients and the servers are typically configured as shown in FIG. 2. Referring to FIG. 2, a client 202 is representative of each of the clients 110-116 of FIG. 1 and a server 204 is representative of each of the servers 102-108 of FIG. 1. In FIGS. 1 and 2, the same or similar reference numerals designate the same or similar parts. Client 202 comprises an interface 206 to a communication line 208 set up to communication network 118 (not shown in FIG. 2), a content data request program 210 for outputting data processing request messages 126, a client processor 212, a plurality of computer programs 214 and 216 (such as a browser 214 and a word processor 216), a display device 218, and a page setting program 220 for setting up a page format when sending and receiving data from server 204. Content data request program 210 and page setting program 220 can be part of a browser program.

Server 204 comprises a server processor 222, a request message reception program 224 for receiving messages from client 202, a content data provider program 226 for providing messages to client 202, at least one data processing program 228 (for example implemented as servlets using JAVA™ technology), an interface 230 for interfacing to the network, and a local data base 232 for storing a plurality of data sets, such as HTML pages. Request message reception program 224 and content data provider program 226 can be part of a web server program. Server 204 can also comprise a special service provider program 234, which provides special services that may not be provided by other servers. Server 204 retrieves or generates, in response to a data processing request message 126 from client 202, data that can be located in the local database 232 (static retrieval) or located elsewhere at another server. In the case that the data is located at another server, server 204 uses backend tunnel 124 to retrieve the data from the other server. Sun Microsystems, Sun, the Sun logo, and JAVA are trademarks or registered trademarks of Sun Microsystems, Inc., Palo Alto, Calif., in the United States and other countries.

Server 204 has an Application Program Interface (API) 236 for accessing an operating system and other devices. APIs provide an abstraction between a program and the kernel to provide portability of the program code. An API can also provide an interface between a high level language and lower level utilities and services that were written without consideration for the calling conventions supported by compiled languages. In this case, the API's main task may be the translation of parameter lists from one format to another and the interpretation of arguments in one or both directions. Thus, the API serves as a kind of interface unit to server processor 222 for processing the data in accordance with the type of processing requested in the client's message. Server processor 222, however, requires information about the type of processing requested and about the location of the data to be processed or to be retrieved on the server side.

Figure 3A:
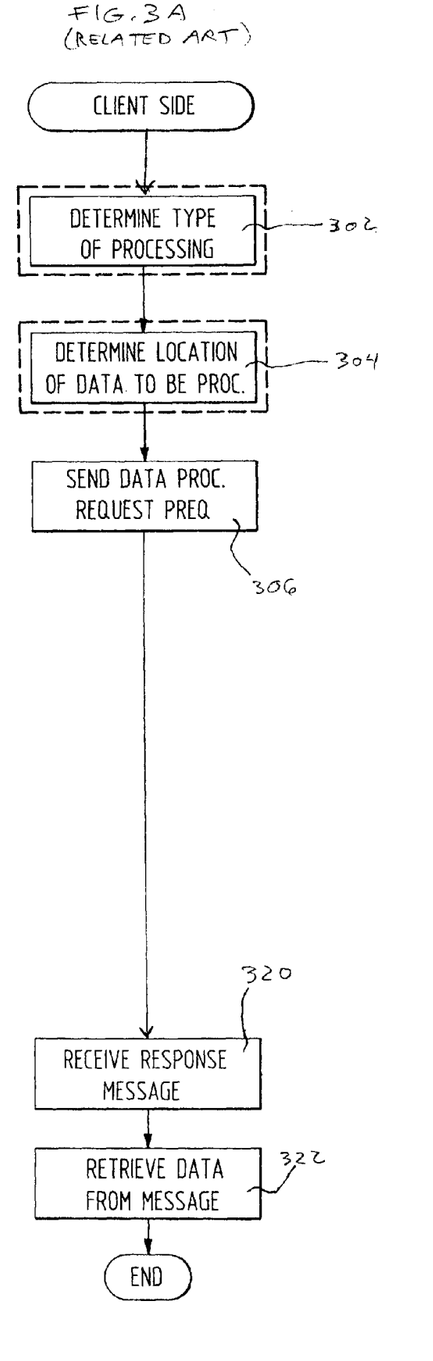
FIGS. 3A and 3B are flow diagrams illustrating the steps of exchanging messages in the conventional data processing system of FIG. 1.
Figure 3B:
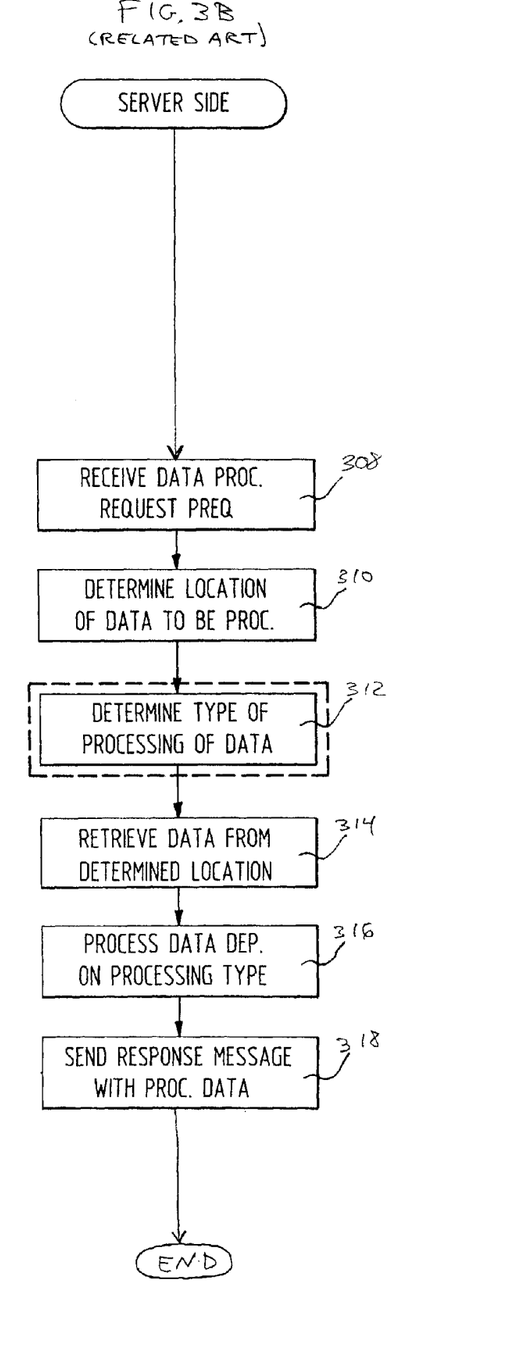

FIGS. 3A and 3B depict flowcharts illustrating the steps of a conventional exchange of request messages 126 and response messages 128 between a client, such as client 112, and a server, such as server 104. FIG. 3A depicts the steps executed at the client, while FIG. 3B shows the steps executed at the server.

Referring to FIG. 3A, first, client 112 runs, for example, browser program 214 selected from the group of programs 214 and 216 on client processor 212. The client then determines the type of processing to be performed at the server (step 302). For example, if the user uses the browser program on the client to view a web page stored on the server, then the client will determine that the processing will be the retrieval of web page data. The dashed-line box associated with step 302, or with any other step described herein, indicates that the operation may involve the use of subprograms.

Then, client 112 determines the location of the input data to be processed (step 304). As will be described in more detail below, if communication network 118 is the Internet, then the location of input data to be processed may be indicated with a Universal Resource Locator (URL) specification.

Client 112 then sends data processing request message 126 to the server side of communication network 118 (step 306). Data processing request message 126 includes at least a first portion having an input data location reference that indicates the location of at least one input data to be processed at the server side of the data processing system 100. The server that receives request message 126 is conventionally determined by a load balancing function performed by a load balancer (not shown).

Referring to FIG. 3B, the server that was determined by the load balancer to receive the request message 126 then receives the request message 126 (step 308). For example, server 104 receives the request message 126. Server 104 then determines the location of the input data to be processed (step 310). The input data to be processed can be located on server 104 or at another location, such as on another server. Then, server 104 determines the type of processing to perform with respect to the input data, such as whether server 104 is to perform calculations using the data (step 312). In step 312, server 104 can also load a servlet 228 to perform processing on the data. Alternatively, server 104 can perform a predetermined type of processing, for example, if server 104 normally performs a particular type of processing on input data.

Server 104 then retrieves the input data from the location that was determined in step 310 (step 314). After the input data has been retrieved, server 104 processes the input data using the type of processing determined in step 312 (step 316). Then, server 104 generates a response message, such as response message 128, and sends the response message to client 112 (step 318). Response message 128 includes, for example, output data that was generated during the processing. Alternatively, response message 128 can indicate that a requested type of processing has been completed successfully.

Referring back to FIG. 3A, client 112 then receives response message 128 from server 104 (step 320). After having received the response message, client 112 then retrieves the processing results or requested data from response message 128 (step 322).

As described above with reference to step 310 of FIGS. 3B, servers are normally capable of determining the location of data that is to be processed when the input data is located, for example, in a memory or in a secondary storage. The conventional manner of doing this and a known problem associated therewith is depicted in FIGS. 4A and 4B.

Figure 4A:
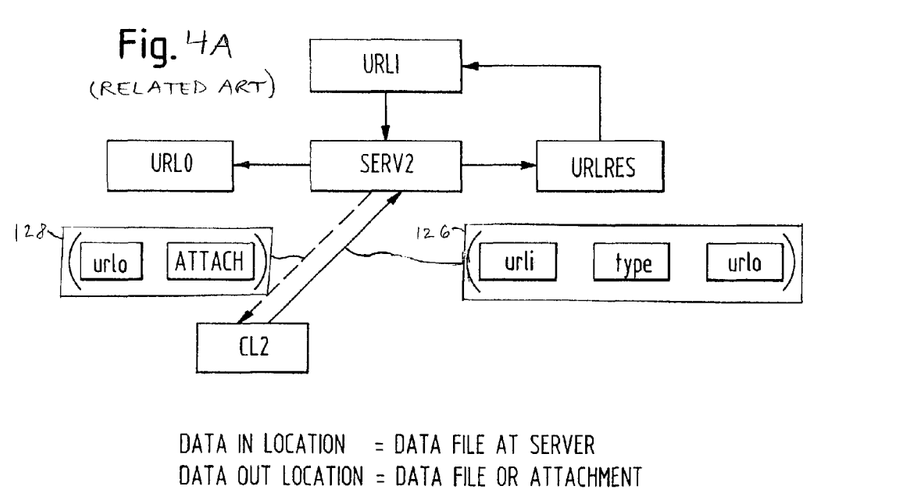
FIG. 4A depicts a block diagram of a message exchange in the conventional data processing system of FIG. 1.
Figure 4B:
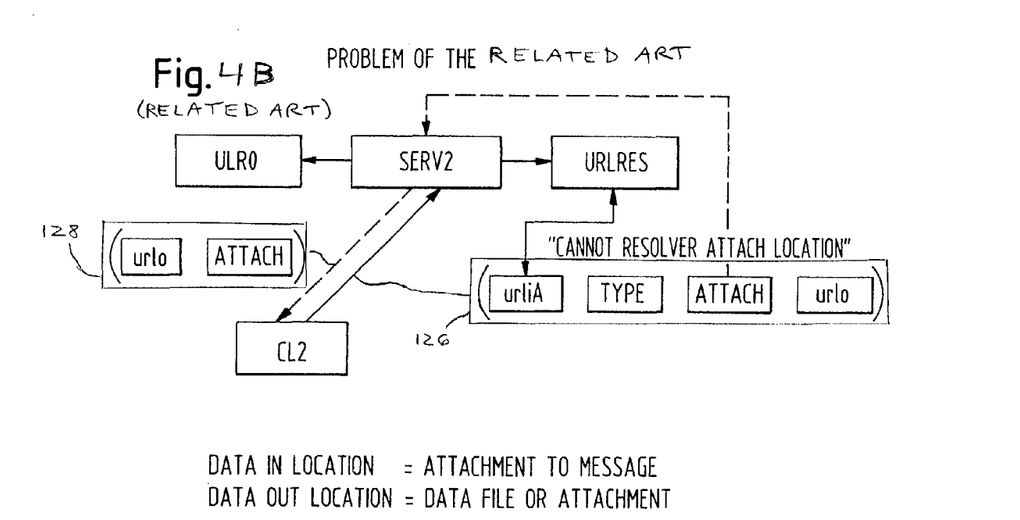
FIG. 4B depicts a block diagram illustrating a problem associated with a conventional message exchange.

Referring to FIG. 4A, FIG. 4A depicts a block diagram illustrating the conventional exchange of data processing request messages from a client and response messages from a server. As shown, two different types of data location references are required. A first type of data location references is used in the request messages to indicate the location of the input data to be processed. These data location references are called "in parameters." A second type of data location references indicates a specified output data location, that is the location where the output data that results from the server's processing is to be outputted. These second type of data location references are called "out parameters."

Thus, in parameters and out parameters specify the source and destination locations of the process data. More precisely, they conventionally specify the source and destination location addresses or location references where the data to be processed and the data that has been processed are stored. An example of a storage location identified by such a location reference or address is a memory address or a part of a memory array comprising a plurality of storage locations. Hereinafter, the storage location itself (e.g., the memory location) will be designated in capital letters, such as URLI, URLN, and URLO, while location references to the storage locations will be designated in small letters, such as urli, urln, and urlo.

FIG. 4A depicts the scenario in which request message 126 is sent from client 112 to server 104. As illustrated, request message 126 includes location references urli and urlo, which respectively identify the input URLI and output URLO locations for the input data and output data. Conventionally, request message 126 comprises the data location reference urli indicating the location URLI of at least one data set to be processed by server 104. Optionally, request message 126 further comprises the type of processing to be performed and an output location reference urlo identifying where the output data is to be stored.

In a typical example, request message 126 relates to a scenario in which a user at client 112 requests server 104 to fax a document located at a certain location URLI, which is indicated by the input location reference urli, to another location URLO, which is indicated by the output location reference urlo. In another example, the user may be using a word processing program and requests the server to translate a document located at a certain input data location URLI and to return the translation to the user at an output data location ULRO.

A resolver program at the server determines the input location URLI of the data from the input location reference urli in the request message, so that the server can fetch the data from the input location URLI. The resolver program is, for example, a web page hosting program. After performing the data processing on the input data, server 104 puts the output data into the output location URLO referenced by the output reference address urlo. As indicated in FIG. 4A, response message 128 may comprise an indication urlo of the output location URLO (an out parameter) where the output data is stored.

Further, in certain implementations, such as in Simple Object Access Protocol (SOAP) implementations, response message 128 may also have an attachment portion ATTACH. The attachment portion can be any type of attachment appended to the response message. Therefore, for example, the input data location URLI may be a data file located at server 104 and the data output location URLO may be a data file at server 104 or an attachment ATTACH attached to response message 128. As can be understood from FIG. 4A, it is necessary to specify input locations URLI in request messages, but optional to specify output locations URLO via the reference urlo. Depending on the type of desired processing, the client can also indicate a reference urlo for the output location URLO, or alternatively, the output reference urlo is generated by the server and is indicated to the client in response message 128. Accordingly, the place where the resultant data is output can be designated by out parameters, such as by URLs that can be resolved by a URL resolver, or by an attachment attached to response message 128.

Referring to FIG. 4B, FIG. 4B depicts a known problem associated with the conventional scenario shown in FIG. 4A. The problem arises when a request message includes an input location reference urliA that identifies an input location that is not a data file URLI, but is instead an attachment ATTACH to the request message itself. That is, the data to be processed is attached to the request message, which is a typical scenario in SOAP implementations.

While, in principle, the input location reference urliA will still serve the purpose of indicating the location of the input data to be processed, such an input location reference urliA is not understood by conventional URL resolvers. That is, a conventional URL resolver, as depicted in FIGS. 4A and 4B, expects to see in the input location reference urliA a URL that has a standard URL format, which indicates a typical memory location or the location of a data file. The location reference urlia, however, does not have this standard type of URL format and therefore the conventional URL resolver, when examining the input location reference urliA, is not able to detect the input location reference. Instead, the URL resolver typically ignores the input location reference urliA, because the content does not have the expected format for URL data location referencing. Therefore, the conventional URL resolver will not be able to identify the input storage location from the input location reference, when the input location reference identifies the request message itself or an attachment to the request message.

In SOAP implementations, the input location reference urliA serves as a kind of "envelope" for the attachment data, and a conventional URL resolver cannot identify this as a standard URL location reference. Thus, while SOAP attachments describe a way to reference attachments via URLs, these URLs cannot be resolved using conventional URL resolvers on servers since they do not reference a location accessible by a conventional protocol. Thus, if the request message carries input data to be processed at a server, the location of this data (as being a part of the request message itself) cannot be identified by the conventional server, and therefore the server cannot process the attached data.

SUMMARY OF THE INVENTION

Methods, systems, and articles of manufacture consistent with the present invention enable a server to process input data that is received in an attachment to a request message from a client. To process the input data, a server program copies or moves the input data from the attachment to a new storage location that is accessible by the server program. For example, the server program moves the input data into the server's memory. When the input data is in this new location, it is accessible by the server program and can therefore be processed. Accordingly, the server program is no longer required to process the input data while the input data is still in the attachment.

For example, a user at the client uses a client program, which is capable of sending SOAP requests and triggering an on-line translation service, to send a document to a translation service located at a server to translate the document into another language. The client program sends a request message to the server that includes a request to translate the document and includes the document in an attachment. The request message also includes an input location reference that identifies that the document is within the attachment. When the request message is received at the server, the server program identifies that the document is in the attachment from the input location reference, and therefore copies the document to a new memory location in the server's memory. Since the server program can readily access the document when it is in server's memory, the server program can therefore translate the document. Therefore, while servers cannot conventionally process input data that is located in an attachment to a client's request message, methods, systems, and articles of manufacture consistent with the present invention allow the servers to process such data by storing the input data in a new storage location that is accessible by the servers.

In accordance with methods consistent with the present invention, a method in a data processing system having a client and a server, the server having a program, is provided. The method comprises the steps performed by the program of: receiving a message from the client instructing the server to process data; determining whether the data is located in an attachment to the message; and moving the data to another location other than in the attachment responsive to the data being located in the attachment.

In accordance with methods consistent with the present invention, a method in a data processing system having a client and a server, the server having a program, is provided. The method comprises the steps performed by the program of: receiving a message from the client instructing the server to process data, the message including a first location reference that identifies a location of the data; reading the first location reference of the message; when the first location reference identifies that the data is located in an attachment to the message, moving the data from the attachment to a memory location; processing the data; generating an output data based on the processing of the data; storing the output data in an attachment to a response message, the response message including a second location reference that identifies a location of the output data; and sending the response message to the client.

In accordance with articles of manufacture consistent with the present invention, a computer-readable medium containing instructions that cause a server program, in a data processing system having a client and a server, to perform a method is provided. The method comprises the steps of: receiving a message from the client instructing the server to process data; determining whether the data is located in an attachment to the message; and moving the data to another location other than in the attachment responsive to the data being located in the attachment.

In accordance with articles of manufacture consistent with the present invention, a computer-readable medium containing instructions that cause a server program, in a data processing system having a client and a server, to perform a method is provided. The method comprises the steps of: receiving a message from the client instructing the server to process data, the message including a first location reference that identifies a location of the data; reading the first location reference of the message; when the first location reference identifies that the data is located in an attachment to the message, moving the data from the attachment to a memory location; processing the data; generating an output data based on the processing of the data; storing the output data in an attachment to a response message, the response message including a second location reference that identifies a location of the output data; and sending the response message to the client.

In accordance with systems consistent with the present invention, a server data processing system is provided. The server data processing system comprises: a memory comprising a program that receives a message from a client instructing the server to process data, determines whether the data is located in an attachment to the message, and moves the data to another location responsive to the data being located in the attachment; and a processing unit that runs the program.

In accordance with systems consistent with the present invention, a server data processing system is provided. The server data processing system comprises: means for receiving a message from a client instructing the server to process data; means for determining whether the data is located in an attachment to the message; and means for moving the data to another location responsive to the data being located in the attachment.

In accordance with articles of manufacture consistent with the present invention, a computer-readable memory device encoded with a program having a data structure is provided. The program is run by a processor of a server in a data processing system having the server and a client. The data structure comprises: a message having a reference to a data storage location, wherein the program moves the data to another data storage location and replaces the reference with a new reference to the other data storage location responsive to the data storage location being located in an attachment to the message.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

In the drawings, references that are in lower-case type, such as urli, urliA, urln and urlo, designate a location reference that identifies to a storage location or the addressing of such a storage location. And references that are in upper-case type, such as URLI, URLIA, URLN and URLO, designate an actual storage location, such as a memory on the server side of the network. Also, in flow diagrams and block diagrams, operations and elements surrounded by a dashed or dotted line are optional for their respective function.

DETAILED DESCRIPTION OF THE INVENTION

Reference will now be made in detail to an implementation consistent with the present invention as illustrated in the accompanying drawings. Wherever possible, the same reference numbers will be used throughout the drawings and the following description to refer to the same or like parts.

Methods, systems, and articles of manufacture consistent with the present invention enable a server to process input data that is received within an attachment to a request message from a client. Conventional servers cannot process such input data, because those servers cannot identify the location of the input data when it is within an attachment. To overcome this conventional problem, the server program copies or moves the input data from the attachment to a new storage location that is accessible by the server program. For example, the server program moves the input data into the server's memory. When the input data is in this new location, it is accessible by the server program and can therefore be processed.

In an illustrative example, a user at the client uses a client program that is word processing program, which is capable of sending SOAP requests and triggering an on-line translation service, to send a document to a translation service located at a server. The client program sends a request message to the server that includes a request to translate the document and includes the document in an attachment. The request message also includes an input location reference that identifies that the document is within the attachment. When the request message is received at the server, the server program identifies that the document is in the attachment from the input location reference, and therefore copies the document to a new memory location in the server's memory. Since the server program can readily access the document when it is in server's memory, the server program can therefore perform the translation.

While the description below references examples relating to a message exchange between a client and a server over the Internet, where web pages are retrieved from a server unit in a JAVA™ programming environment, one having skill in the art will appreciate that methods, systems, and articles of manufacture consistent with the present invention are not limited thereto.

Figure 5:
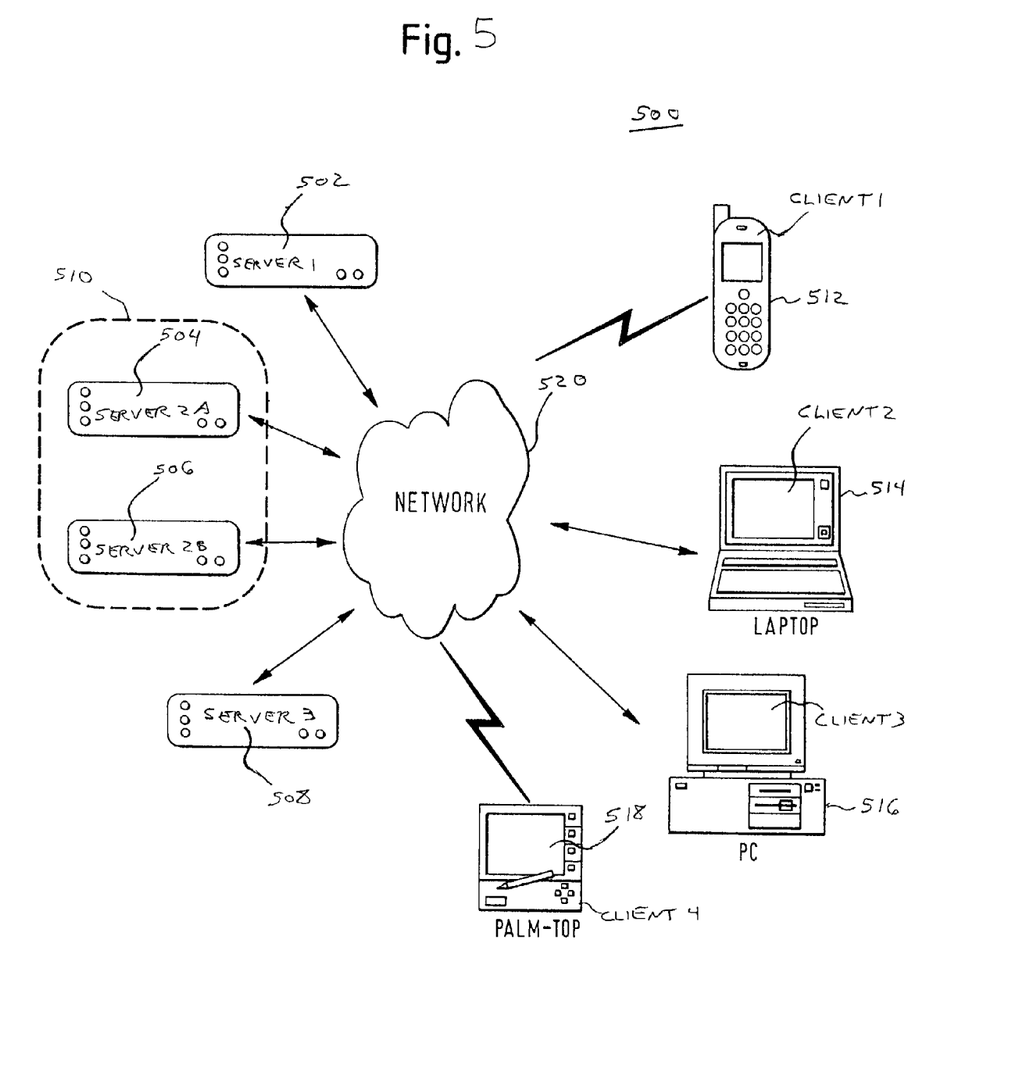
FIG. 5 depicts a block diagram of a data processing system suitable for use with methods and systems consistent with the present invention.

Referring to FIG. 5, FIG. 5 depicts a block diagram of a data processing system 500 suitable for use with methods and systems consistent with the present invention. Data processing system 500 comprises a plurality of servers 502, 504, 506, and 508 and clients 512, 514, 516, and 518 connected to a network 520. The network is of a type that is suitable for connecting the clients and servers for communication, such as a circuit-switched network or a packet-switched network. Also, the network may include a number of different networks, such as a local area network, a wide area network such as the Internet, telephone networks including telephone networks with dedicated communication links, connection-less networks, and wireless networks. Each of the servers and clients shown in FIG. 5 is connected to the network via a suitable communication link, such as a dedicated communication line or a wireless communication link.

The clients are devices that are suitable for communicating over a network. For example, as illustrated, client 512 is a mobile telephone, client 514 is a laptop computer, client 516 is a desktop computer, and client 518 is a palm-top computer. These client devices may be any kind of device equipped with hardware and software in accordance with methods and systems consistent with the present invention. The embodiments of the various clients are presented for illustrative purposes, and the clients are not limited to the embodiments shown in FIG. 5.

In the illustrative example of FIG. 5, client 512, which is a mobile telephone, is connected to the network via a wireless communication link, whereas client 516, which is a desktop computer, is connected to the network via a communication link that includes a fixed transmission line, for example, to a household or an office.

Further, the clients are capable of receiving input from a user requesting to process input data. The user can input the user's request, for example, by making an input selection with a mouse click, with entry of input keys on the client, or by using the user's voice. The input data can be, for example, parameters, technical data, a text document, video information, or audio information. Also, the user's request can specify that the output data contains data in a specific format or that the output data includes commands for further processing. For example, the output data can be telephone directory information that can be displayed on a display device of the client.

The servers shown in FIG. 5 can be operated by different providers or vendors. For example, a first vendor or a provider may operate server 502 and another provider or vendor may operate server 508. One of the vendors or providers can also operate two servers, as illustrated by the dashed-line box 510 surrounding servers 504 and 506.

Figure 6:
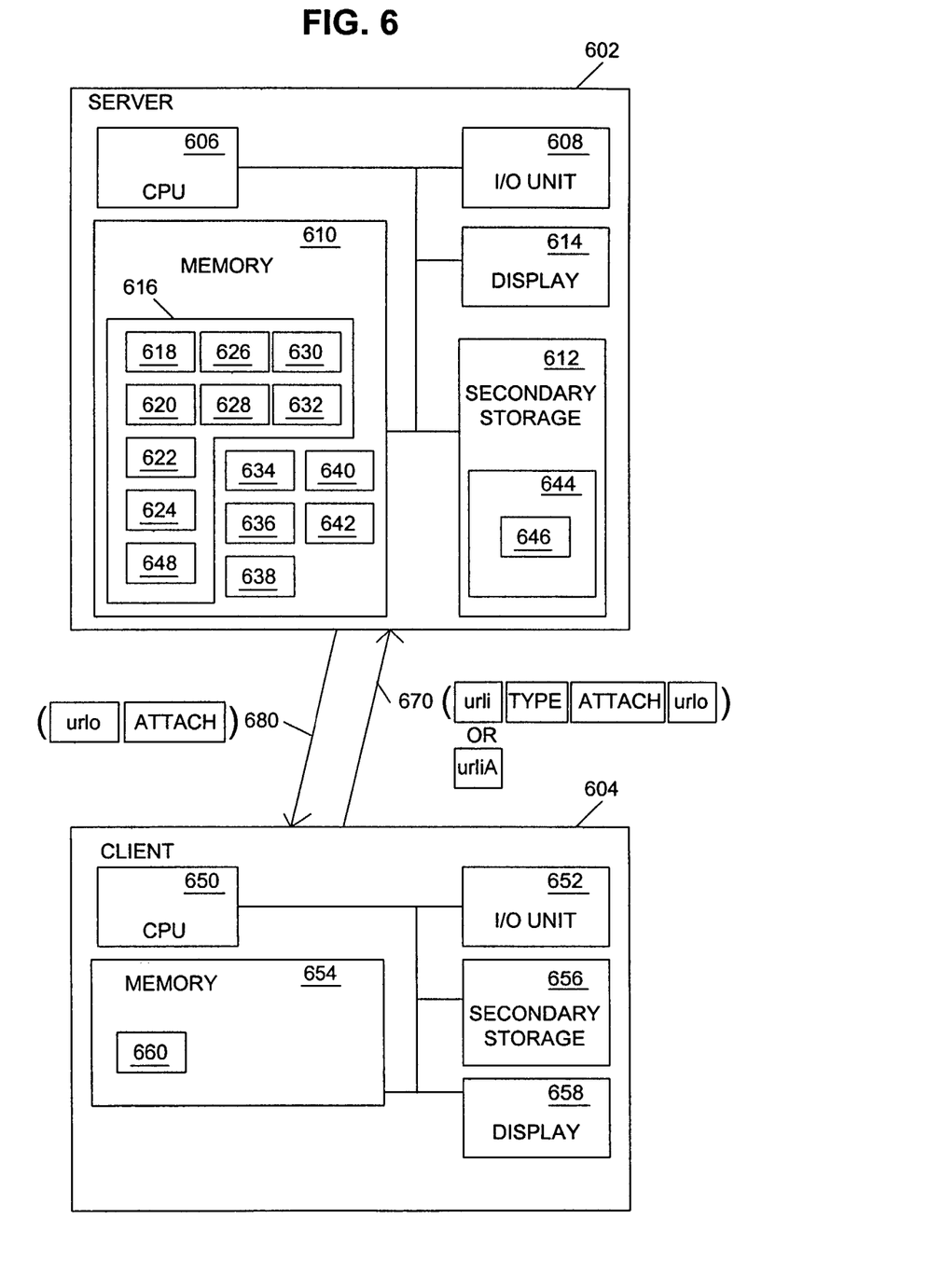
FIG. 6 depicts a more detailed block diagram of a client and a server of FIG. 5.

Referring to FIG. 6, FIG. 6 shows a more detailed depiction of a server 602 that is illustrative of the servers 502-510 and a client 604 that is illustrative of the clients 512-518 shown in FIG. 5. Server 602 comprises a central processing unit (CPU) 606, an input output I/O unit 608, a memory 610, a secondary storage device 612, and a video display 614. Server 602 may further comprise standard input devices such as a keyboard, a mouse or a speech processing means (each not illustrated).

The server's memory 610 contains a server program 616 for receiving and processing request messages and sending response messages. Server program 616 has a request message receiving code portion 618 for receiving request messages, a content data provider code portion 620 for sending response messages, a server application program interface (API) 622 for interfacing to other programs, an interface code portion 624 for interfacing to the network, an analyzer code portion 626 for analyzing location references in a message, a storing code portion 628 for storing output data, a forwarding code portion 630 for forwarding location references to other programs, and a rewriting code portion 632 for rewriting location references in messages.

Memory 610 also contains one or more servlets 634 and can contain- one or more special service programs 636. A service is considered "special" when it is provided by one of the servers, and may not be provided by the others. For example, a server provides a special service when that server alone hosts a web page and contains the web page data.

Memory 610 also contains storage locations for data, including an input storage location (URLI) 638, a new storage location (URLN) 640, and an output storage location URLO 642. One having skill in the art will appreciate that, while these memory locations are depicted in the server's memory 610, they can alternatively be in another location, such as on the server's secondary storage 612 or at another server.

The server's secondary storage 612 contains a local database 644 that includes output data 646, such as one or more HTML web pages.

Figure 7:
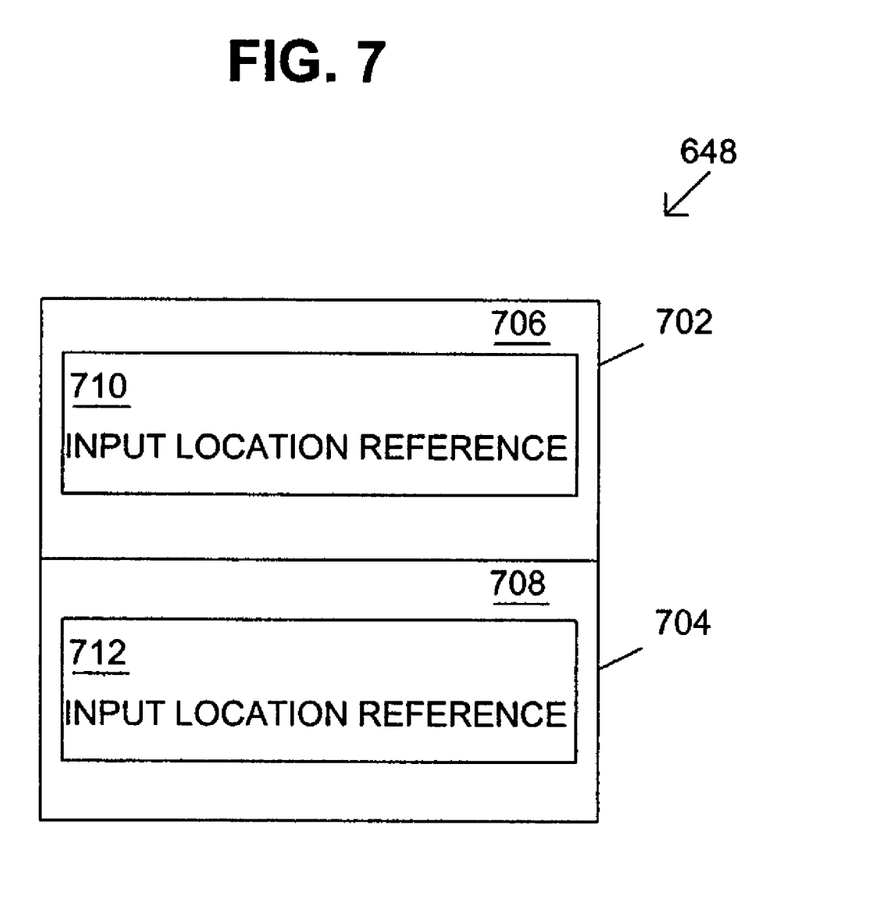
FIG. 7 depicts a block diagram of a data structure suitable for use with methods and systems consistent with the present invention.

The server program also includes a data structure 648. Referring to FIG. 7, FIG. 7 shows data structure 648 in more detail. Data structure 648 has a plurality of entries 702 and 704. Each entry reflects a request message 706 and 708 comprising an input location reference 710 and 712, respectively. The server program replaces the input location reference with a new location reference when the server program determines that input data is included in an attachment to the respective request message. The new location reference identifies a storage location, for example, in the server's memory.

Referring back to FIG. 6, FIG. 6 also shows a more detailed depiction of a client 604 that is illustrative of clients 512-518 depicted in FIG. 5. Client 604 comprises a central processing unit (CPU) 650, an input output I/O unit 652, a memory 654, a secondary storage device 656, and a video display 658. Client 604 may further comprise standard input devices such as a keyboard, a mouse or a speech processing means (each not illustrated). The client's memory 654 contains a client program 660 for sending request messages and receiving response messages. The client program can also comprise additional functionality. For example, the client program can provide functionality for word processing, communications, web browsing, or calculating. The client program can be any type of program that can send request messages and receive response messages in accordance with methods, systems, and articles of manufacture consistent with the present invention.

Each of the programs in the server's memory 616 and in the client's memory 654 will be described in more detail below. For illustrative purposes, it will be assumed that the various programs described herein are operating in a JAVA™ programming environment, however, one having skill in the art will appreciate that methods, systems, and articles of manufacture consistent with the present invention are not limited thereto. Also, the programs may comprise or may be included in one or more code sections containing instructions for performing their respective operations. While the programs are described as being implemented as software, the present implementation may be implemented as a combination of hardware and software or hardware alone.

Although aspects of methods, systems, and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of data processing system 500 have been described, one skilled in the art will appreciate that a data processing system suitable for use with methods, systems, and articles of manufacture consistent with the present invention may contain additional or different components.

As will be described in more detail below, a client, such as client 604, sends a request message 670 that includes a request for a type of data processing to a server, such as server 602, in order have an input data processed by that server or another server on the server side of the network. For example, the client can request that a facsimile document be sent from one location to another location. In another example, the client can request that a document residing in a database on the server side be translated by a particular server and that the translated document be returned to the client or to another location. One having skill in the art will appreciate that the client request message can be for other types of data processing at the server, such as but not limited to, providing web page data, providing or managing other data, or on-line transactions. In turn, the server sends a response message 680 to the server. The response message includes, for example, data that was request in the request message, an acknowledgement, or processing results.

Since the data to be processed resides at a particular location and since the client may want the output data to be stored at a specific location, the client and server use location referencing during the message exchange. For purposes of this disclosure, a "location reference" is an item, such as a pointer, that identifies the physical location of a storage location. A location reference may also contain an address identifying a particular data stored at a particular address in the identified storage location. The storage location on the server side may be any kind of memory either inside a server or outside the server, such as a computer-readable medium, a ROM, or a RAM.

Request messages and response messages may contain an input location reference urli, an output location reference urlo, and an attachment ATTACH. The input location reference urli identifies an input storage location URLI of data to be processed at the server. The output location reference urlo identifies an output storage location URLO of output data from the processing. Further, the input location reference or the output location reference may identify that the data is stored or to be stored in the attachment ATTACH itself, such as in SOAP implementations. In these cases, the input location reference is designated urliA and the output location reference is designated urloA. When the network includes the Internet, the location reference can be Uniform Resource Locator (URL) parameters. Also, although the examples described herein state that the original data is included in an attachment to a request message, one having skill in the art will appreciate that the original data can be located at a different location, such as on the client, on the server, or on another server in the network.

Figure 8:
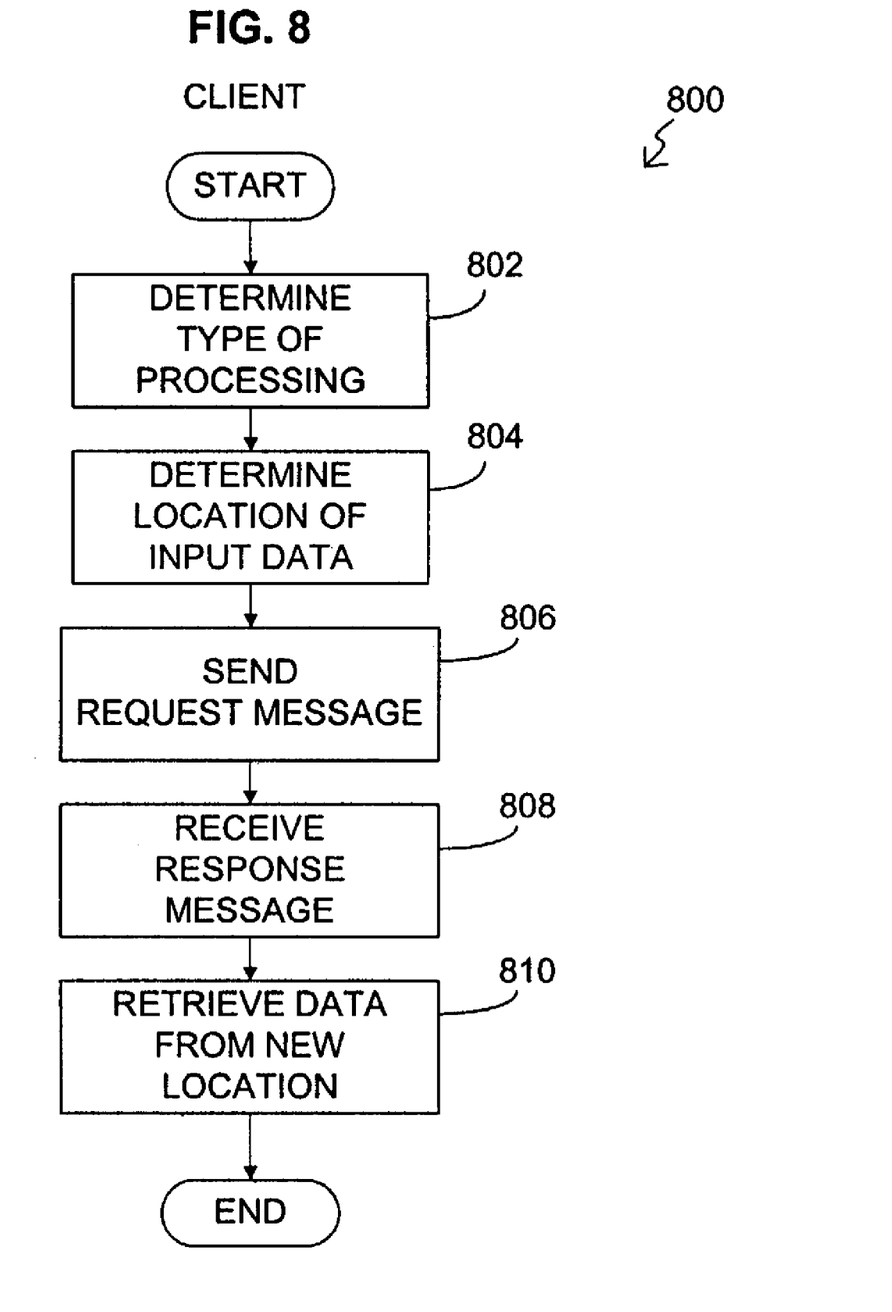
FIG. 8 depicts a flow diagram illustrating the steps performed by the client of FIG. 6.
Figure 9:
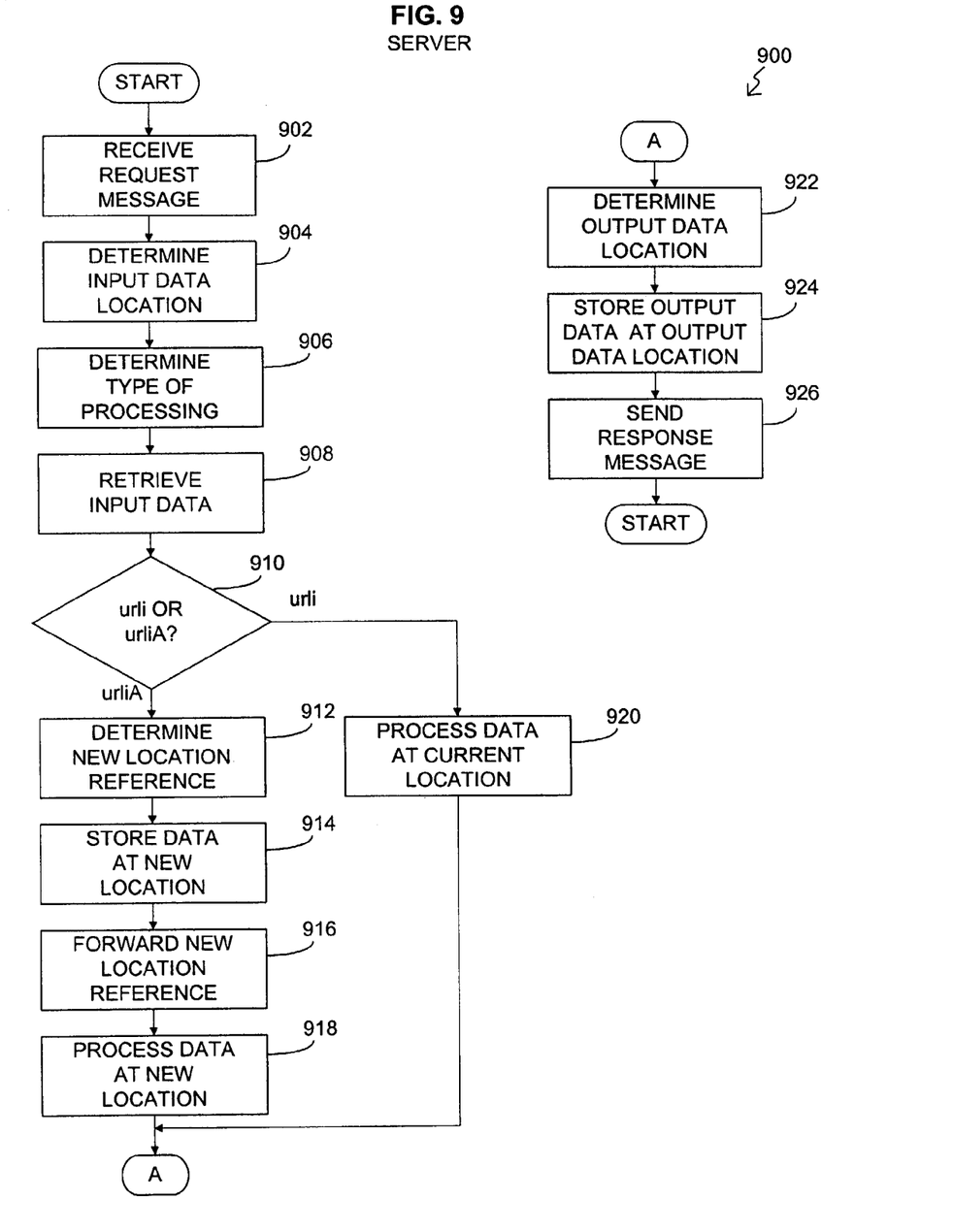
FIG. 9 depicts a flow diagram illustrating the steps performed by the server of FIG. 6.

In the illustrative example introduced above, the user at the client use the client program to request translation of a document by a translation service located at a server. The client sends a request message to the server that includes the document and a request to translate the document. The document is included in the message as an attachment, thus, the input location reference urli in the request message points to the attachment ATTACH as the input storage location URLI. Methods and systems consistent with the present invention allow the server to locate the document even though it is within the attachment and to process the data responsive to the request message. FIGS. 8 and 9 depict flow diagrams illustrating exemplary steps performed by the client program and the server program, respectively, for performing this functionality in accordance with methods and systems consistent with the present invention. The flow diagrams of FIGS. 8 and 9 are described below.

FIG. 8 depicts a flow diagram 800 illustrating exemplary steps performed by the client program for message exchange with a server including location referencing in accordance with methods and systems consistent with the present invention. In FIG. 8, first, the client program determines the type of processing to be performed at the server (step 802). The client program can make this determination, for example, based on an input received from a user. Referring to the illustrative example, the user wants to use the client program to send the document to the server for translation. Therefore, the client program determines that the server needs to translate the document. One having skill in the art will appreciate that, although the examples described herein describe that one type of processing is performed on the data, more than one type of processing can be performed. Also, the request message may include more than one input location reference, and the request message and response message may include more than one output location references.

Then, the client program determines the location of the input data to be processed (step 804). In the illustrative example, the input data is the document, which is included in an attachment to a request message, as described below. Alternatively, the input data can be at another location either at the client or elsewhere. For example, the input data can be located in the client's secondary storage or in the client's memory. The client program identifies the physical location URLI of the input data using the input location reference urli or urliA.

After the client program determines the location of the input data in step 804, the client program generates the request message and sends it to the server (step 806). The request message, such as request message 670 in FIG. 6, includes items for one or more input location references and the type of processing. Also, the request message may include one or more attachments or output location reference. The input location reference urli or urliA is included in, for example, a first portion of the request message to indicate the location URLI or ATTACH of the input data to be processed by the server. After the request message is generated, the client program sends the request message to the server via the network.

As will be described in more detail below, the server then analyzes the request message to determine the type of processing and the location of the input data. The server performs the processing and returns a response message to the client. The client program then receives the response message (step 808). The response message includes an output location reference urlo identifying the storage location URLO of the output data resulting from the server processing. Alternatively, the response message includes an output location reference urloA identifying a response message attachment ATTACH that includes the output data. The client program then reads the output location reference urlo or urloA to determine the location of the output data and reads the output data (step 810).

Referring to FIG. 9, FIG. 9 depicts a flow diagram 900 illustrating exemplary steps performed by the server program for message exchange with the client including location referencing in accordance with methods and systems consistent with the present invention. In FIG. 9, first, the server program receives the request message from the client via the network (step 902). The request message includes at least one input location reference urli or urliA indicating the input storage location URLI or ATTACH of the input data. Then, the server program reads the input location reference urli or urliA in the request message to determine the input data storage location (step 904). When the server program reads the input location reference, it can determine whether the input location reference complies with a standard format, such as a standard URL format. In that case, if the server program determines that the input location reference does not comply with the standard URL format (e.g., if the request message is a SOAP message), then the server program will conclude that the input data is located in an attachment to the request message.

The server program also reads the request message to determine the type of processing to perform on the input data (step 906). If the type of processing has been prescribed beforehand or if the server performs a default type of processing, then step 906 may be optional. After the type of processing is determined, the server program retrieves at least a portion of the input data from the determined input storage location URLI or ATTACH (step 908). In other words, the server reads the input data from either a physical storage location URLI or reads the input data from the request message attachment ATTACH.

In step 904, the server program identified the input location of the input data. Based on that identification, the server program determines whether the input location reference identifies a storage location (i.e., an input location reference urli) or the attachment (i.e., an input location reference urliA) (step 910). If the server program determines that the input location reference urliA refers to the attachment in step 910, then the server program identifies a new location reference urln indicating a new storage location URLN at the server side where the input data is to be stored (step 912). In other words, the server program identifies a storage location for the input data besides in the attachment. This facilitates processing of the input data. The new storage location URLN is, for example, a portion of the server's memory or a storage location on the server's secondary storage. Also, the new storage location can be a location that is remote from the server.

The server program can also determine a plurality of new input location references urln1, urln2, ..., urlnx that identify a plurality of new storage locations URLN1, URLN2, ... URLNX. For example, if the input data comprises a large amount of data, the server program can separate and distribute the input data to a plurality of storage locations.

After the new location reference is determined in step 912, the server program copies the input data to the new storage location URLN (step 914). Alternatively, the server program can move the input data from the attachment to the new storage location.

Then, if required, the server program forwards the new location reference urln to a processing unit, such as another computer program, responsible for processing the input data stored at the new storage location (step 916). For example, if the request message requests the input data to be translated into another language, the server program can forward the new location reference urln to a language translation program on the server side for processing. The server program forwards the location information to the other program using, for example, a forwarding message or a call command. Further, when the server program forwards the location information, the server program can also send a trigger, such as an execution command, to the other program for triggering the processing of the input data, which is located at the new storage location URLN.

Further, instead of forwarding the new location reference to the other program in a newly-generated message or call, the server program can alternatively replace the original input location reference urli in the request message with the new input location reference urln, and then forward the request message to the other program.

Then, the server program or another processing program then processes the input data, which is located at the new storage location URLN (step 918). For example, if the processing involves the translation of the document, the server program translates the document during step 918. As a result of the processing, the server program or the other program generates an output data.

If the server program determines in step 910 that the input location reference urli indicates a storage location URLI that is not the attachment to the request message, then the server program processes the input data, which is located at the input storage location URLI (step 920). One having skill in the art will appreciate that, alternatively, the server program can store the input data in a new storage location (similar to steps 912-916) even though the input location reference urli does not indicate that the input data is located in an attachment. In that case, the server program will perform steps similar to steps 912-916 prior to performing step 920. Also, if the processing is performed by a computer program other than the server program, after that computer program finishes processing the input data, it notifies the server program that the processing is completed and sends the output data to the server program.

After the processing is completed in step 918 or step 920, the server program determines the output location reference urlo of an output storage location URLO for the output data (step 922). The output storage location can be, for example, a memory or secondary storage location URLO on the server side. In this case, the output location reference is designated as urlo herein. Alternatively, the output storage location can be in an attachment ATTACH to a response message sent from the server to the client. In that case, the output location reference is designated as urloA for illustrative purposes of this disclosure. Also, if the request message from the client includes the output location reference, then the server program will determine that that output location reference will be used for the output data.

The server program can also determine that the output data will be stored at a plurlity of output storage locations. For example, if the output data comprises a number of items or requires a large amount of memory, then the server program can provide a plurality of output location references urlo1, urlo2, ..., urlox that identify a plurality of output storage locations URL01, URL02, ..., URLOX. Then, the server program stores the output data at the determined output storage location URLO or ATTACH (step 924).

The server program then sends a response message to the client (step 926). The response message includes at least the output location reference urlo or urloA indicating to the client where the output data has been stored. In an example, if the output storage location is a file at the server, the response message output location reference can be a URL indicating the file at the server. For example, the output location reference can be "vnd.sun.star.temp.file", where "temp.file" identifies the file name in which the output data is stored. If the output data is included in an attachment ATTACH to the response message, the output location reference can be, for example, the URL "vnd.sun.star.attach", in which "attach" identifies to the client program that the output data is in the attachment.

Therefore, while servers cannot conventionally process input data that is located in an attachment to a client's request message, methods, systems, and articles of manufacture consistent with the present invention allow the servers to process such data by storing the input data in a new storage location that is accessible by the servers. Accordingly, the servers can access the input data in the new storage location, instead of in the attachment.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed:

1. A method for processing data sets in a data processing system including at least one client unit and at least one server unit, the method comprising the steps of:
    receiving a data processing request at a server unit from a client unit, wherein the data processing request includes at least one data location reference indicating a location of at least one data set to be processed by at least one processing program of the server unit;
    ascertaining whether the data location reference indicates a location of the data set as being at the server unit or in an attachment to the data processing request, wherein the ascertaining includes concluding that the location of the data set is in an attachment to the data processing request responsive to the data location reference failing to comply with at least one standard format;
    determining at least one new location reference indicating at least one new storage location at the server unit if the data location reference indicates the data set location as being in an attachment to the data processing request;
storing at least a portion of the data set at the at least one new storage location indicated by the at least one new location reference;
forwarding the at least one new location reference to the at least one processing program of the server unit; and
processing, by the at least one processing program of the server unit, the data set stored at the at least one new storage location indicated by the at least one new location reference.

2. The method of claim 1, further comprising the step of:
forwarding an execution trigger to the processing program of the server unit to process the data.

3. The method of claim 1, further comprising the step of:
sending a response message to the client unit, the response message including a reference to a location of a result of the processing.

4. The method of claim 3, wherein the location of the result of the processing is in an attachment to the response message.

5. The method of claim 3, wherein the result of the processing includes web page data.

6. The method of claim 1, wherein the data processing request further includes a requested processing type, and wherein the method further comprises:
determining a processing program suitable to carry out the requested processing type, wherein the forwarding step comprises forwarding the at least one new location reference to the determined processing program.

7. The method of claim 1, wherein the forwarding comprises forwarding the at least one new location reference to a plurality of processing programs which are each suitable for carrying out the data processing of the data set stored at the new storage location.

8. The method of claim 1, wherein the determining at least one new location reference comprises determining a plurality of new data location references, and wherein the storing comprises storing the data set at the plurality of new storage locations indicted by the plurality of new location references.

9. The method of claim 1, wherein the data processing request includes a plurality of data location references, wherein the determining the at least one new location reference comprises determining a single new location reference, and wherein the storing comprises storing a plurality of data sets indicated by the plurality of data location references at the single new storage location indicated by the single new location reference.

10. The method of claim 1, wherein the data processing request includes a plurality of data location references, wherein the determining the at least one new location reference comprises determining a plurality of new location references, and wherein the storing comprises storing a plurality of data sets indicated by the plurality of data location references at the plurality of new storage locations indicated by the plurality of new location references.

11. The method of claim 1, wherein when the data location reference contained in the data processing request indicates a data storage location of the server unit as a location of the data set to be processed, the storing further comprises storing the data set at the data storage location, wherein the new location reference corresponds to the data storage location.

12. The method of claim 1, wherein the data comprises numerical information.

13. A non-transitory computer-readable medium containing instructions that cause a server program, in a data processing system having a client and a server, to perform a method comprising the steps of:
receiving a message from the client instructing the server to process input data, the server comprising a processing program for processing the input data;
determining whether the input data is located in an attachment to the message, wherein the determining includes concluding that the location of the input data is in an attachment to the message responsive to an input data location reference in the message failing to comply with at least one standard format;
moving the input data to another location other than in the attachment responsive to the input data being located in the attachment;
when it is determined that the input data is located in the attachment, replacing, in the message, a reference to the location of the input data in the attachment with a reference to the other location;
sending the message to the processing program;
instructing the processing program to process the input data; and
storing output data corresponding to a result of the processing of the input data in an output storage location, the output storage location comprising an attachment to a response message to be sent to the client.

14. The computer-readable medium of claim 13, further comprising the step of:
processing the input data.

15. The computer-readable medium of claim 13, further comprising the step of:
sending a response message to the client, the response message including a reference to the output storage location.

16. The computer-readable medium of claim 15, wherein the result of the processing includes web page data.

17. A data processing system comprising:
a memory comprising a program that
receives a message from a client instructing a server to process data, the server comprising a processing program for processing the data,
determines whether the data is located in an attachment to the message, wherein the program concludes that the location of the data is in an attachment to the message responsive to an data location reference in the message failing to comply with at least one standard format,
moves the data to another location responsive to the data being located in the attachment,
when it is determined that the data is located in the attachment, replaces, in the message, a reference to the location of the data in the attachment with a reference to the other location,
sends the message to the processing program,
instructs the processing program to process the data; and
sends a response message to the client, the response message including a reference to a location of a result of the processing;
a processing unit that runs the program.

18. A data processing system comprising:
means for receiving a message from a client instructing a server to process data, the server comprising a processing program for processing the data;
means for determining whether the data is located in an attachment to the message, wherein the means for determining whether the data is located in an attachment to the message includes means for concluding that the location of the data is in an attachment to the message responsive to a data location reference in the message failing to comply with at least one standard format;

means for moving the data to another location responsive to the data being located in the attachment;
means for replacing, in the message, a reference to the location of the data in the attachment with a reference to the other location, when it is determined that the data is located in the attachment;
means for sending the message to the processing program; and
means for instructing the processing program to process the data.

* * * * *